United States Patent
Toyoda et al.

[11] 3,896,063
[45] July 22, 1975

[54] PROCESS FOR PRODUCING VINYLIDENE CHLORIDE/VINYL CHLORIDE COPOLYMERS

[75] Inventors: Yasushi Toyoda; Hidetora Kashio, both of Iwaki, Japan

[73] Assignee: Kureha Kagaku Kogyo Kabushiki Kaisha, Tokyo, Japan

[22] Filed: Feb. 5, 1973

[21] Appl. No.: 329,413

Related U.S. Application Data

[63] Continuation-in-part of Ser. No. 146,622, May 25, 1971, abandoned.

[30] Foreign Application Priority Data
May 28, 1970 Japan .................. 45-45836

[52] U.S. Cl. .............. 260/23 XA; 260/45.85 R; 260/45.95 R; 260/92.8 A
[51] Int. Cl. .......................................... C08f 19/14

[58] Field of Search ........... 260/23 XA, 45.95 R, 260/45.85 R, 92.8 A

[56] References Cited
UNITED STATES PATENTS

| | | | |
|---|---|---|---|
| 3,468,828 | 9/1969 | Derrins | 260/23.7 |
| 3,533,975 | 10/1970 | Scullin | 260/23 XA |
| 3,558,537 | 1/1971 | Meeker | 260/23 XA |

*Primary Examiner*—Melvyn I. Marquis
*Assistant Examiner*—William E. Parker
*Attorney, Agent, or Firm*—Wenderoth, Lind & Ponack

[57] ABSTRACT

In order to produce odorless vinyl chloride/vinylidene chloride copolymers having excellent heat-stability, a particular phenol type polymerization stabilizer is added to the monomer at the time of polymerization with or without the addition of epoxidized soy-bean oil.

2 Claims, 2 Drawing Figures

LEGEND: A ------ POLYMER NOT CONTAINING ANTI-OXIDIZING AGENT

B(x) ---- POLYMER CONTAINING 0.03% OF 2,6-DITERTIARY-BUTYL-4-METHYLPHENOL ADDED AT THE TIME OF MONOMER CHARGING

B(□) ---- POLYMER CONTAINING 0.03% OF N-PROPYLGUALATE ADDED AT THE TIME OF MONOMER CHARGING

CONDITIONS FOR MEASURING AMOUNT OF HYDROCHLORIC ACID REMOVED

TEMPERATURE : 170°C

POLYMER : 3 g

CARRIER GAS : DESICCATED NITROGEN

GENERATED HYDROCHLORIC ACID GAS IS ABSORBED INTO WATER, AND TITRATED WITH CAUSTIC SODA UPTO THE NEUTRALIZING POINT TO FIND OUT THE AMOUNT OF HCl REMOVED.

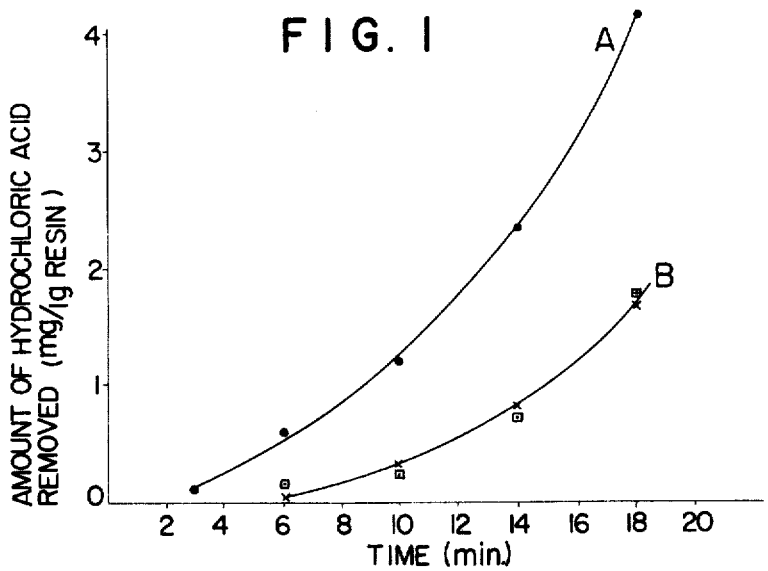

FIG. 1

LEGEND: A ------ POLYMER NOT CONTAINING ANTI-OXIDIZING AGENT

B(x) ---- POLYMER CONTAINING 0.03% OF 2,6-DITERTIARY-BUTYL-4-METHYLPHENOL ADDED AT THE TIME OF MONOMER CHARGING

B(□) ---- POLYMER CONTAINING 0.03% OF N-PROPYLGUALATE ADDED AT THE TIME OF MONOMER CHARGING

CONDITIONS FOR MEASURING AMOUNT OF HYDROCHLORIC ACID REMOVED

| | |
|---|---|
| TEMPERATURE : | 170°C |
| POLYMER : | 3 g |
| CARRIER GAS : | DESICCATED NITROGEN |

GENERATED HYDROCHLORIC ACID GAS IS ABSORBED INTO WATER, AND TITRATED WITH CAUSTIC SODA UPTO THE NEUTRALIZING POINT TO FIND OUT THE AMOUNT OF HCl REMOVED.

YASUSHI TOYODA and
HIDETORA KASHIO,

INVENTORs

LEGEND: C —— NO EPOXIDIZED BEAN OIL

D —— ADDED WITH 1.2 PARTS BY WEIGHT OF EPOXIDIZED BEAN OIL AFTER POLYMERIZATION

E —— ADDED WITH 1 PART BY WEIGHT OF EPOXIDIZED BEAN OIL AT THE TIME OF MONOMER CHARGING

F —— ADDED WITH 0.03 PART BY WEIGHT OF 2,6-DITERTIARYBUTYL-4-METHYLPHENOL AND 1 PART BY WEIGHT OF EPOXIDIZED BEAN OIL AT THE TIME OF MONOMER CHARGING

3,896,063

PROCESS FOR PRODUCING VINYLIDENE CHLORIDE/VINYL CHLORIDE COPOLYMERS

REFERENCE TO RELATED APPLICATION

This is a continuation-in-part application of our copending application Ser. No. 146,622 filed May 25, 1971 and now abandoned for "Process for Producing Vinylidene Chloride/Vinyl chloride Copolymers".

BACKGROUND OF THE INVENTION

This invention relates to a process for producing vinylidene chloride/vinyl chloride copolymers for use as vinylidene chloride films. More particularly, it relates to the improvement in the production of odorless vinylidene chloride/vinyl chloride copolymers having improved heat-stability.

SUMMARY OF THE INVENTION

It is an object of the present invention to provide a method for producing heat-stable, odorless copolymers of vinylidene chloride and vinyl chloride in the presence of a particular polymerization stabilizer.

According to the present invention, there is provided a process for producing relatively odorless copolymers of vinylidene chloride and vinyl chloride having excellent heat stability which comprises conducting a suspension-polymerization in the presence of a phenol type polymerization stabilizer such a 2, 6-ditertiarybutyl-4-methylphenol and n-propyl gallate, and, if necessary, epoxidized soy-bean oil, the polymerization stabilizer serving to prevent the vinylidene chloride monomer from being oxidized by oxygen existing in the polymerization system as well as by the oil-soluble polymerization initiator used in the system, and the epoxidized soy-bean oil serving to protect the resulting polymer from the influence of hydrochloric acid produced in small quantities during the polymerization reaction by capturing it.

The nature, principle, and details of the present invention will become more apparent from the following description thereof when read in conjunction with preferred embodiments of the invention and accompanying drawing.

BRIEF DESCRIPTION OF THE INVENTION

In the drawing, FIGS. 1 and 2 are, respectively, graphical representation indicating the effect attained by the present invention.

DETAILED DESCRIPTION OF THE INVENTION

Figure 2:
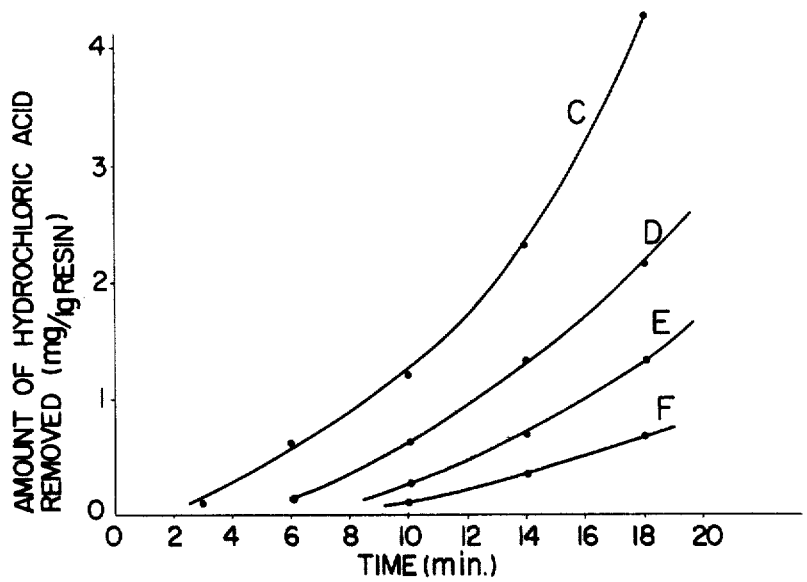

In general, the copolymer of vinylidene chloride and vinyl chloride consists of 65 to 95 % of vinylidene chloride and 5 to 35 % of vinyl chloride. The copolymer is mainly used to produce food packing material such as films, bottles, etc., and fibrous materials. These food packing materials and fibers, in conjunction with its good mechanical strength, are strongly required to have excellent heat stability at the time of molding into shaped articles, minimal odor, and non-toxicity. Where the heat stability is poor, shaping of the polymers becomes difficult due to the generation of dissociated substances, or, if shaped, such dissociated substances mix in the shaped products to cause coloration thereto, or the shaped products issue a strong acidic odor to make them entirely unsuitable as goods of commercial value.

As the results of various studies on heat stability and odor of vinylidene chloride/vinyl chloride copolymers, it has become evident that the addition of a stabilizer at the time of shaping would not greatly contribute to improving the heat-stability and reducing odor, and that such phenomenon is derived from the raw material polymer itself. The oxidation of the monomer, oxidation decomposition of polymer, deterioration by heat of the polymer, etc. are considered to be the principal causes of the poor heat-stability and odor characteristics of the polymer itself. The vinylidene chloride monomer is known to be highly reactive with oxygen, reaction of which with a small quantity of oxygen produces peroxide. The peroxide readily turns into phosgene which in turn reacts with water to produce hydrochloric acid. Also, vinylidene peroxychloride functions as a polymerization initiator, and a polymer resulting therefrom is known to considerably deteriorate the heat stability thereof. Thus, when vinylidene chloride monomer contacts oxygen, hydrochloric acid is finally produced to impair the quality of the resultant polymer. It is therefore desirable that no oxygen exists within the polymerization system. However, since oxygen is dissolved in either the vinylidene chloride monomer, or the vinyl chloride monomer, or water, or in all of them, it is virtually difficult to perfectly remove it. Furthermore, even if oxygen can be successfully removed from these reactants, the oxidation due to the oil-soluble polymerization initiator cannot be avoided.

While it has been well known that oxidation inhibitors (anti-oxidation agents) serve to prevent the monomer or the polymer from becoming oxidized, they cannot be added at the time of polymerization, since many of them are liable to cause stoppage in the polymerization reaction or considerable delay in the polymerization speed. An example of such adverse-effect rendered by these oxidation inhibitors to the polymerization speed is that addition of only 0.1 part by weight of butyl-hydroxyanisole or p-hydroxyanisole to 100 parts by weight of the vinyl or the vinylidene chloride monomer would substantially completely stop the polymerization reaction. Even in the case that the polymerization proceeds with addition in a small quantity of some of such oxidation inhibitors, the reaction speed thereof is extremely slowed down.

The present inventors have therefore studied effective preventive measures for the oxidation of vinylidene chloride and vinyl chloride monomers as well as polymers obtained therefrom without lowering the polymerization speed to any remarkable extent at the time of the vinylidene chloride/vinyl chloride copolymerization in the presence of an oil-soluble polymerization initiator, as the result of which the use of 2,6-ditertiarybutyl-4-methylphenol or n-propyl- gallate has been found to yield the most desirable effects.

The addition of these stabilizers in a relatively large quantity of 0.1 part by weight causes only a slight delay in the polymerization speed, and addition of a quantity of below 0.1 part by weight does not affect the polymerization speed to any appreciable degree. It is assumed that these stabilizers may probably hinder radical formation due to the oxidation of the vinylidene chloride monomer, but they do not act on the radical once formed and give no adverse effect to the polymerization.

The following Table shows the relationship between the added quantity of the stabilizer according to the present invention and the polymerization speed affected thereby.

| ADDED QUANTITY OF STABILIZERS (Part by weight with respect to 100 parts by weight of monomer) | POLYM-ERIZATION TIME (hrs) | POLYMERIZATION YIELD (%) |
|---|---|---|
| (2,6-ditert-butyl-4-methylphenol) | | |
| — | 65 | 82.9 |
| 0.01 | 65 | 83.2 |
| 0.02 | 65 | 83.2 |
| 0.03 | 65 | 82.5 |
| 0.04 | 68 | 82.7 |
| 0.05 | 72 | 82.5 |
| 0.06 | 78 | 82.5 |
| 0.10 | 96 | 82.2 |
| (n-propyl-gallate) | | |
| 0.03 | 65 | 83.0 |
| 0.06 | 71 | 82.5 |

(NOTE) Suspension polymerization was conducted at 40°C with the following recipes.
| vinylidene chloride | 80 | wt. parts |
| vinyl chloride | 20 | wt. parts |
| 4-chloro-butyl peroxydicarbonate | 0.02 | wt. part |

By the addition of the above-mentioned oxidation inhibitor (stabilizer) at the time of the polymerization, oxidation of the monomers or the polymer can be prevented to a considerable extent. However, it is still difficult to perfectly inhibit the reaction between the monomer and oxygen, or peroxide, hence a small quantity of hydrochloric acid unavoidably comes out.

When hydrochloric acid co-exists, the dissociation of the vinylidene chloride/vinyl chloride copolymers is accelerated and the resulting polymer issues a disagreeable acidic odor, and its heat-stability is impaired. In order to solve this provlem, a hydrochloric acid capturing agent is added to the polymerization system together with the oxidation inhibitor (anti-oxidation agent), whereby hydrochloric acid produced during the polymerization is captured to prevent the polymer produced in the course of the polymerization from dissociation, and a polymer of good heat stability and minimal possible odor is obtained.

Many substances have been known as the hydrochloric acid capturing agents, most of which, however, are either insoluble in the monomer, or too poisonous or foul smelling to be practically used.

As the results of repeated experiments using various sorts of hydrochloric acid capturing agents, epoxidized soy-bean oil has been found to yield a polymer of the best quality, when it is used in combination with either one of the aforementioned stabilizers.

Such excellent effect to be obtained by the addition of these compound during the polymerization can also be recognized from pH value of the slurry after the polymerization. That is, when the polymerization is conducted with addition of 2,6-ditert-butyl-4-methylphenol, or n-propyl gallate along with epoxidized soy-bean oil, hydrochloric acid derived from the monomers and the resultant polymer is successfully captured, and the pH value stays at 5 to 6, while it goes down as low as 3 to 3.5 in case no epoxidized soy-bean oil is added.

Copolymerization of vinylidene chloride and vinyl choride is carried out by a suspension-polymerization method. In more detail, a monomer mixture composed of 65 to 95 parts by weight of vinylidene chloride and 35 to 5 parts by weight of vinyl chloride is suspended in a suspension agent dissolved in water and the polymerization is carried out in the presence of a polymerization initiator and polymerization assistant. In this case, quantity of water to be used as a suspension medium ranges from 50 to 1,000 parts by weight with respect to 100 parts by weight of the monomer mixture. The polymerization reaction mostly proceeds at a constant temperature, and, in some cases, the polymerization temperature is raised stepwisely or continuously. The temperature range is from 10° to 80°C.

For the polymerization initiator, there are various kinds such as, for example, benzoyl peroxide, lauroyl peroxide, azobisisobutyl nitrile, diisopropyl peroxy dicarbonate, 4-chlorobuty peroxy dicarbonate, and other oil soluble radical initiator. Quantity of the polymerization initiator should preferably be as small as possible, which is usually from 0.01 to 0.5% by weight with respect to the total monomer mixture.

For the suspension agent, any kind of water-soluble high polymers which are usually used in the suspension-polymerization may be used. Examples of such suspension agent are methyl cellulose, polyvinyl alcohol, or their saponified products.

It is desirable that 2,6-ditert-butyl-4-methylphenol or n-propyl-gallate as well as epoxidized soy-bean oil be added to the reaction vessel after they are dissolved into the vinylidene chloride monomer at the start of the polymerization. Note that no polymer of excellent heat-stability and minimal odor can be expected to result, when epoxidized soy-bean oil along is added to the reaction system, even if its quantity is increased.

The added quantity of 2,6-ditert-butyl-4-methylphenol and n-propyl-gallate is generally proportionate to the oxygen content in the polymerization system. Considering from the standard oxygen content in the polymerization system, the added quantity ranges from 0.1 to 0.005 part by weight with respect to 100 parts by weight of the monomer.

The added quantity of epoxidized soy-bean oil is from 0.02 to 5 parts by weight with respect to 100 parts by weight of the monomer.

PREFERRED EMBODIMENT

In order to induce persons skilled in the art to reduce the present invention into practice, the following preferred examples are presented. It is to be noted that these examples are illustrative only and that they do not intended to narrow the scope of protection as afforded by the appended claims.

EXAMPLE 1

4 l of ion-exchanged water containing 0.1 % of methylcellulose is charged into an autoclave of 10-liter capacity. After the remaining space within the autoclave is sufficiently substituted for nitrogen, a monomer mixture of 0.4 kg of vinyl chloride and 1.6 kg of vinylidene chloride containing 0.135 % of diisopropyl peroxydicarbonate and 0.03 % of 2,6-ditertiarybutyl-4-methylphenol is dispersed in the water, and polymerization is carried out at a temperature of 40°C. After a lapse of 64 hours, 0.3 g of distearyl-thio-dipropionate and 0.4 g of gutyl-hydroxyanisole are dissolved into 10 g of vinylidene chloride monomer which is then charged under pressure into the autoclave and agitated for about 30 minutes, thereafter the polymerization is stopped. A polymer is obtained at a rate of yield of 83 %. The pH value of the water phase at the termination of the polymerization is 5.5. The governing factors to the heat-stability of this polymer is shown in FIG. 1. That is, a polymer obtained by addition of 0.03 part by weight of 2,6-ditert-butyl-4-methylphenol with respect to 100 parts by weight of monomer is compared with a polymer obtained under the same conditions as above except for that no stabilizer is added in terms of a quantity of hydrochloric acid removed at an elevated temperature of 170°C. A remarkable stabilizing effect is recognized by the addition of the stabilizer.

EXAMPLE 2

Polymerization is conducted under the exactly same conditions as in Example 1 above with the exception that 0.03 % of normal-propyl-gallate is used in place of 2,6-ditert-butyl-4-methylphenol. The post-treatment after a lapse of 65 hours of polymerization is also exactly the same as in Example 1. The pH value of the water phase at the termination of polymerization is 5.6, and the rate of yield is 82 %.

The quantity of hydrochloric acid removed at 170°C from the obtained polymer is shown in FIG. 1. A remarkable stabilizing effect can be recognized as is the case with 2,6-ditert-butyl-4-methylphenol.

EXAMPLE 3

40 l of distilled water, in which 20 g of methyl cellulose is dissolved, is charged into a stainless steel, high pressure type, autoclave of 100-litre capacity. After the space within the autoclave is perfectly substituted for nitrogen gas, a monomer mixture of 4 kg of vinylchloride and 16 kg of vinylidene chloride containing therein 27 g (0.135 %) of diisopropyl peroxydicarbonate, 6 g (0.03 %) of 2,6-ditertiarybutyl-4-methylphenol, and 200 g (1.0 %) of epoxidized soy-bean oil is dispersed, and agitated at 40°C for polymerization. At the 64th hour from the start of the polymerization, 100 g of vinylidene chloride monomer, in which 4 g of distearylthio-dipropionate and 4 g of butyl-hydroxyanisole are dissolved, is charged under pressure into the autoclave, and agitated for about 30 minutes, thereafter the polymerization is stopped. The pH value of the water phase in the polymerization system at the termination of the polymerization is 5.8.

Next, the polymerized slurry is heated at a temperature of 80°C to recover the unreacted monomer, and to separate the polymer which assumes white color and has no odor at a rate of yield of 83 %. The rate of removal of hydrochloric acid from this polymer is as shown by a curve F in FIG. 2, which tells that the polymer possesses excellent heat-stability.

To this polymer, 6 parts by weight of dibutyl sebacate is added, and then inflated at a temperature of 180°C to form a film of five one-hundredths mm thick. This film is found to contain no dissociated substances, to be colorless, and to have virtually no odor.

For comparison's sake, a polymer is obtained in the same manner as in producing the abovementioned polymer except for that 2,6-ditertiarybutyl-4-methylphenol and epoxidized soy-bean oil are not added. The pH value of the water phase at the end of this polymerization is 3.2. A film formed by the same inflation method as above is found to assume light yellow and to have a strong acidic odor.

EXAMPLE 4

40 l of distilled water, in which 20 g of methylcellulose is dissolved, is charged into a stainless steel, high pressure type autoclave, and the remaining space within the autoclave is perfectly substituted for nitrogen gas. Thereafter, a monomer mixture of 4 kg of vinyl chloride and 16 kg of vinylidene chloride containing therein 27 g (0.135 %) of diisopropyl peroxydicarbonate, 10 g (0.05 %) of 2,6-ditert-butyl-4-methylphenol, and 400 g (2 %) of epoxidized soy-bean oil is dispersed, and agitated at a temperature of 40°C for polymerization. After a lapse of 72 hours, vinylidene chloride monomer, in which 4 g of distearyl-thio-propionate and 4 g of butyl-hydroxyanisole are dissolved, is charged under pressure into the autoclave, and agitated for 30 minutes, after which the polymerization reaction is stopped. The pH value of the water phase at this time is 5.9. Subsequently, the polymerized slurry is heated to 80°C to recover the unreacted monomer and separate the white polymerizate at a rate of yield of 83 %.

To this polymer, 6 parts by weight of dibutylsebacate is added, and it is inflation-molded to form a film of five one-hundredths mm thick. The thus obtained film is found to be more stable against heat, and have the slightest odor. This film is further put in a bottle, and heated to 80°C to examine the odor. Virtually no odor can be detected in this case.

For comparison, a polymer is obtained in the same manner as in producing the abovementioned polymer except for that no stabilizer is added. To this polymer, 0.072 part by weight of 2,6-ditertiarybutyl-4-methylphenol, 2.4 parts by weight of epoxidized soy-bean oil, and 6 parts by weight of dibutyl sebacate are dry-blended, from which a film is produced in the same condition as above. The resulted film is in slight yellow and has an acidic odor.

Apparently, the polymer obtained by adding the stabilizer during the polymerization indicates better heat-stability and less odor than the polymers obtained by polymerization without addition of the stabilizer during the polymerization but adding the same after completion of the polymerization.

EXAMPLE 5

40 l of distilled water, in which 20 g of methylcellulose is dissolved, is charged into a stainless steel, high pressure type autoclave of 100-liter capacity, and the remaining space within the autoclave is perfectly substituted for nitrogen gas, thereafter 4 kg of vinyl chloride and 16 kg of vinylidene chloride containing 27 g (0.135 %) of diisopropyl peroxydicarbonate, 6 g (0.06 %) of n-propyl-gallate, and 400 g (2 %) of epoxidized soy-bean oil are dispersed into the distilled water, and agitated at a temperature of 40°C for polymerization.

After a lapse of 71 hours, 4 g of distearyl-thio-propionate and 4 g of butyl-hydroxyanisole are dissolved into 100 g of vinylidene chloride monomer, and the solute is charged under pressure into the autoclave, and agitated for about 30 minutes, when the polymerization is stopped. The pH value of the water phase at this time is 5.7. Subsequently, the polymerized slurry is heated to 80°C to recover unreacted monomer and to separate the white, odorless polymerizate at a rate of yield of 83 %.

A film is produced from this polymer under the same method and conditions as in Example 2. The heat-stability and odor of the film are also found to be excellent as in the foregoing examples.

EXAMPLE 6

4 l of ion-exchanged water containing 2 g of methyl cellulose is charged into a stainless steel autoclave of 10-liter capacity. After the remaining space within the autoclave is sufficiently substituted for nitrogen gas, a monomer mixture of 0.36 kg of vinyl chloride and 1.64 kg of vinyledene chloride containing therein 10 g of lauroyl peroxide, 0.6 g of ditertiarybutyl-4-methylphenol, and 20 g of expoxidized soy-bean oil is dispersed in water, and polymerization is carried out by agitation at a temperature of 50°C.

After lapse of 70 hours, 0.4 g of butyl hydroxyanisol is dissolved in 10 g of venylidene chloride monomer which is then charged under pressure into the autoclave and agitated for about 30 minutes, thereafter the polymerization is stopped.

Subsequently, the polymerized slurry is heated to 80°C to separate the polymerizate from the unreacted monomer which is recovered for further use. Thus, a white, odorless polymer is obtained at a rate of yield of 81.5 %.

The polymer film obtained by the same manner as described in Example 3 above is found to be excellent in its heat-stability and odorlessness in comparison with the film produced from a polymer which is not added with a polymerization stabilizer during the polymerization reaction, and added with 2,6-ditertiarybutyl-4-methylphenol and expoxidized soy-bean oil, both being in the same quantity, at the time of processing into film.

EXAMPLE 7

The polymerization reaction is conducted in the same manner as in Example 6 above except for the use of 3 g of azobisisobutyronitrile in stead of 10 g of laurolylperoxide. The lapsed polymerization time is 75 hours, and the rate of yield of the resulted polymer is 80 %. This polymer is treated further in the same manner as in Example 6.

The polymer film obtained by the same manner as described in Example 3 is found to be excellent in its heat-stability and odorlessness in comparison with the polymer film produced from a polymer which is not added with a polymerization stabilizer during the polymerization reaction, and added with 2,6-ditertiarybutyl-4-methylphenol and expoxidized soy-bean oil, both being in the same quantity, at the time of processing into film.

REFERENCE EXAMPLE 4 l of ion-exchanged water containing 0.1 % of methylcellulose is charged into an autoclave of 10-liter capacity, and the remaining space within the autoclave is perfectly substituted for nitrogen gas, thereafter a monomer mixture of 0.4 kg of vinyl chloride and 1.6 kg of vinylidene chloride containing 0.135 % of diisobutyl peroxydicarbonate, and 1 % of epoxidized soy-bean oil, the percentage ratio being with respect to the total quantity of the VDC monomer, is dispersed in the water. The polymerization and post-treatment are carried out in exactly same way and under same conditions as in Example 1.

In 64 hours of the polymerization reaction, the polymerizate is obtained at a rate of yield of 83 %. The heat-stability of this polymer is shown in FIG. 2. From this graphical drawing, it will be clear that the rate of removal of hydrochloric acid by heating at 170°C is best with the polymer obtained by adding 1 part by weight of eposidized soy-bean oil with respect to 100 parts by weight of the monomer at the time of the polymerization (curve E) in comparison with a polymer obtained without addition of the epoxidized soy-bean oil (curve C), and a polymer to which the epoxidized soy-bean oil is added after the polymerization (curve D), although even this polymer added with the epoxidized soy-bean oil at the time of polymerization is still not free from acidic odor when it is heated to 80°C.

In conclusion, addition of epoxidized soy-bean oil during the polymerization contributes greatly to the stability of the polymer.

What we claim is:

1. In a process for producing an odorless copolymer of vinylidene chloride and vinyl chloride having improved heat-stability by suspension-polymerizing a monomer mixture composed of 65 to 95 parts by weight of a vinylidene chloride monomer and 35 to 5 parts by weight of vinyl chloride at a polymerization temperature of from 10° to 80°C using an oil-soluble-polymerization initiator, the improvement which consists of adding to said reaction system at the time of polymerization, a polymerization stabilizer selected from the group consisting of 2,6-ditertiarybutyl-4-methylphenol and normal-propyl-gallate in a quantity ranging from 0.10 to 0.005 part by weight with respect to 100 parts by weight of the vinylidene chloride and vinyl chloride monomers.

2. A process according to claim 1, further comprising adding 0.02 to 5 parts by weight of epoxidized soy-bean oil along with said polymerization stabilizer.

* * * * *